United States Patent
Wang et al.

(10) Patent No.: US 11,741,233 B2
(45) Date of Patent: Aug. 29, 2023

(54) OVERRIDING SUB-SYSTEM IDENTIFIERS WITH PROTECTED VARIABLE VALUES

(71) Applicant: Hewlett-Packard Development Company, L.P., Spring, TX (US)

(72) Inventors: Chin-Yu Wang, Taipei (TW); Ming-Chang Hung, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 383 days.

(21) Appl. No.: 17/045,514

(22) PCT Filed: Jun. 11, 2018

(86) PCT No.: PCT/US2018/036924
§ 371 (c)(1),
(2) Date: Oct. 6, 2020

(87) PCT Pub. No.: WO2019/240759
PCT Pub. Date: Dec. 19, 2019

(65) Prior Publication Data
US 2021/0365561 A1    Nov. 25, 2021

(51) Int. Cl.
G06F 21/57 (2013.01)
G06F 9/38 (2018.01)
G06F 11/07 (2006.01)
G06F 21/60 (2013.01)

(52) U.S. Cl.
CPC .......... *G06F 21/575* (2013.01); *G06F 9/3865* (2013.01); *G06F 11/0772* (2013.01); *G06F 21/572* (2013.01); *G06F 21/604* (2013.01); *G06F 2221/2141* (2013.01); *G06F 2221/2143* (2013.01)

(58) Field of Classification Search
CPC .. G06F 21/575; G06F 9/3865; G06F 11/0772; G06F 21/572; G06F 21/604; G06F 2221/2141; G06F 2221/2143; G06F 9/4406
USPC ................................................. 713/1, 2, 100
See application file for complete search history.

(56) References Cited

U.S. PATENT DOCUMENTS

| | | | |
|---|---|---|---|
| 5,844,986 A | 12/1998 | Davis | |
| 6,598,159 B1 * | 7/2003 | McAlister | G06F 9/4416 709/222 |
| 6,832,372 B1 | 12/2004 | Frye et al. | |
| 2003/0115432 A1 | 6/2003 | Biessener et al. | |
| 2009/0222653 A1 | 9/2009 | Findeisen et al. | |
| 2010/0070800 A1 | 3/2010 | Hanna | |
| 2011/0289478 A1 | 11/2011 | Bernabeu-Auban et al. | |

(Continued)

FOREIGN PATENT DOCUMENTS

| CN | 201374055 | 12/2009 |
|---|---|---|
| CN | 102023875 | 4/2011 |

*Primary Examiner* — Michael J Brown
(74) *Attorney, Agent, or Firm* — Quarles & Brady LLP

(57) ABSTRACT

In one example in accordance with the present disclosure, a computing device is described. The computing device includes a printed circuit assembly and a basic input/output system (BIOS) coupled to the printed circuit assembly. The BIOS includes a subsystem identifier (SSID). The computing device also includes a non-volatile memory device which includes an override flag to indicate whether an override of the SSID is enabled and a protected variable value to, when enabled, override the SSID in the BIOS.

15 Claims, 5 Drawing Sheets

(56) References Cited

U.S. PATENT DOCUMENTS

2014/0082346 A1     3/2014   Tao et al.
2018/0060079 A1     3/2018   Miller et al.

* cited by examiner

OVERRIDING SUB-SYSTEM IDENTIFIERS WITH PROTECTED VARIABLE VALUES

BACKGROUND

A motherboard is the heart of a computing device. The motherboard, or printed circuit assembly, holds and allows communications between many electronic components of a computing device such as a central processing unit (CPU) and memory. The printed circuit assembly also provides connectors for different peripheral devices.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
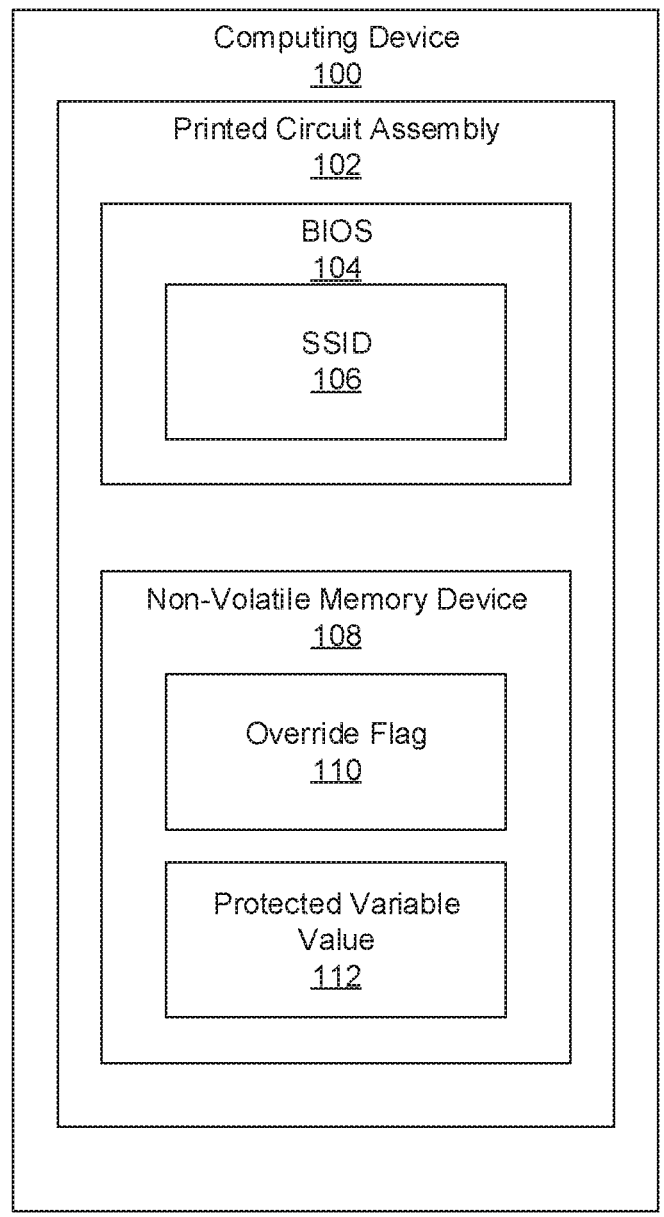
FIG. 1 is a block diagram of a computing device for overriding a subsystem identifier (SSID) with a protected variable value, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The Basic Input/Output System (BIOS) coupled to the motherboard configures the platform components, such as the central processing unit, memory, hard disk drives, operating system and input ports, during initialization and provides runtime services for the an operating system and various programs. A subsystem identifier (SSID), stored in the BIOS, uniquely identify the computing device and indicates which device drivers, for the various components, should be loaded. For example, the operating system of a computing device is configured based on settings associated with the SSID.

While these SSIDs provide a valuable function in that they indicate how hardware components should be configured, some limitations impede their more effective use. For example, a manufacturer may develop multiple computing devices each associated with a different SSID but that use the same printed circuit assembly. For example, a standard computing system and a computing system with an embedded operating system may have the same hardware components, i.e., the same printed circuit board, albeit with or without the same drivers and configuration for those hardware components. Notwithstanding that each of these computers have the same printed circuit board, because they have different SSIDs two different BIOS images are generated, one for the standard computing system and one for the computing system with the embedded operating system. Generating multiple BIOS images for computing devices that have the same hardware components is inefficient and expensive both in resources and cost.

Accordingly, the present specification describes a computing device and system that alleviate this and other issues. Specifically, the present specification describes a system wherein the SSID for a computing device is replaced with a protected variable value. The protected variable value is associated with the printed circuit assembly as well as the configuration of the printed circuit assembly as opposed to the computing device. The variable value indicates for the hardware components, which functions should be enabled, i.e., what drivers should be relied on. Accordingly, rather than have two separate BIOS even though the hardware components are the same, the present specification describes a single BIOS for a given set of hardware components, i.e., printed circuit assembly, and relying on the variable values to indicate what drivers/functionality to enable.

Specifically, the present specification describes a computing device. The computing device includes a printed circuit assembly and a basic input/output system (BIOS) coupled to the printed circuit assembly. The BIOS includes a subsystem identifier. The computing device also includes a non-volatile memory device that stores 1) an override flag to indicate whether an override of the SSID is enabled and 2) a protected variable value to, when enabled, override the SSID in the BIOS.

The present specification also describes a method. According to the method, during startup of a computing device, it is determined whether an override of a subsystem identifier (SSID) of a basic input/output system (BIOS) with a protected variable value is enabled. When enabled, the protected variable value is extracted from a non-volatile memory device of the computing device. The SSID in the BIOS is overridden with the protected variable value and the computing device is booted based on the protected variable value.

The present specification also describes a tangible, non-transitory machine readable storage medium comprising machine readable program code embodied therewith. The machine readable program code includes program instructions that, when executed, causes a processor to 1) determine, during startup of a computing device, whether an override of an SSID of a BIOS with a protected variable value is enabled, 2) extract the protected variable value from a non-volatile memory device of the computing device, 3) override the SSID in the BIOS with the protected variable value, and 4) boot the computing device based on the protected variable value.

In summary, using such a computing device 1) allows for one BIOS to be used per printed circuit assembly; 2) increases organizational efficiency as redundancy in BIOS is reduced; 3) saves the cost of regulatory fees of maintaining similar printed circuit assemblies associated with different SSIDs; and 4) reduces maintenance of multiple BIOS codes with different SSIDS for shared printed circuit assemblies. However, the devices disclosed herein may address other matters and deficiencies in a number of technical areas.

Turning now to the figures, FIG. 1 is a block diagram of a computing device (100) for overriding a subsystem identifier (SSID) (106) with a protected variable value (112), according to an example of the principles described herein. The computing device (100) may be a device that executes computing operations and that includes a printed circuit assembly (102). Examples of computing devices (100) include desktop computers, laptop computers, tablet devices, gaming consoles, personal computing devices, and smartphones among others. In general, different computing devices (100) are associated with different subsystem identifiers (SSIDs) (106). For example, one model of a laptop computer may have a first SSID and another model of a laptop may have a different SSID (106).

The computing device (100) includes a printed circuit assembly (102). The printed circuit assembly (102) may be referred to as a motherboard. The printed circuit assembly (102) is the main circuit board in the computing device (100) and facilitates communication between hardware components of the computing device (100). Examples of hardware components that rely on the motherboard for communication include the central processing unit, the chipset, memory, general purpose input/output devices, port hardware, and others.

Coupled to the printed circuit assembly is a Basic Input/Output System (BIOS) (104). The BIOS (104) contains the settings and other configuration information for the hardware components on the printed circuit assembly (102). The BIOS (104), upon startup, may indicate how to configure memory and which operating system to load on the computing device (100). The BIOS (104) indicates particular drivers and configuration information based on the SSID (106) of the computing device (100) which is stored in the BIOS (104). For example, the SSID (106) within the BIOS (104) may identify that a standard operating system is to be loaded on the computing device (100). This information is acquired from the BIOS (104) and the standard operating system is loaded. In another example, the SSID (106) for a different computing device (100) may identify that an embedded operating system, which has different functionality, is to be loaded on the computing device (100). This information is acquired form the BIOS (104) and the embedded operating system is loaded. Note that in this example, while different hardware configurations are triggered by the different SSIDs (106), the printed circuit assembly (102) may be the same. That is, both the computing device (100) with the standard operating system and the computing device (100) with the embedded operating system may have the same hardware components, but with different configurations.

Historically, based on the different SSIDs (106), different BIOS (104) modules have been generated for each computing device (100), notwithstanding that both computing devices (100) have the same hardware components. As described above, the present computing device alleviates the need for separate BIOS modules for the same printed circuit assembly. Specifically, the computing device (100) includes a non-volatile memory device (108). The non-volatile memory device (108) refers to memory which maintains the data stored therein in the face of power loss. Stored within the non-volatile memory device is an override flag (110) which determines whether the SSID (106) associated with the computing device (100) can be overridden with a protected variable value (112) associated with the printed circuit assembly (102).

In other words, during startup, an SSID (106) associated with the computing device (100) is overridden with an alternate ID, that is the protected variable value (112), which is particularly tailored to the printed circuit assembly (102). That is, the SSID (106) is tied to a particular computing device (100) and the protected variable values (112) are tied to the printed circuit assembly (102) and configuration information for the components associated therewith. Different protected variable values (112) represent different functionalities of the hardware components. Using this system, the same BIOS (104) can be used in different computing devices (100) notwithstanding different SSIDs (106) because the SSID (106) is overridden with the protected variable value (112). The protected variable value (112) may indicate configuration information for the hardware components associated with the printed circuit assembly (102).

The override flag (110) indicates whether an override of the SSID (106) is enabled. The override flag (110) may be a Boolean value to indicate that 1) the SSID (106) can be overridden with the protected variable value (112) or 2) the SSID (106) cannot be overridden with the protected variable value (112).

The protected variable value (112) is associated with a printed circuit assembly (102) and indicates particular drivers and other configuration information for a particular computing device (100). For example, when a protected variable value (112) associated with a laptop computer is input to the BIOS (104), the laptop computer will upon startup, implement certain functionalities. By comparison, when a variable value (112) associated with a tablet device is input to the BIOS (104), the tablet device will upon startup, implement different functionalities. In this example, both the laptop computer and the tablet device have the same printed circuit assembly (102) but may have different functionalities enabled. In some examples, the protected variable value (112) is a 2-byte value.

Both the override flag (110) and the protected variable value (112) may be protected from end user alteration. That is, during manufacturing a programmer sets the override flag (110) and the protected variable value (112) in such a fashion that they are not accessible in a user mode. Moreover, the override flag (110) and the protected variable value (112) are preserved following a load-default command. That is, following a load-default command, variables stored in the BIOS (104) may be reset to a default value. However, the override flag (110) and the protected variable value (112) by being preserved in a non-volatile memory device (108), and not the BIOS (104), are preserved when such a command is issued.

Moreover, as the override flag (110) and the protected variable value (112) are stored in a non-volatile memory device (108), a BIOS update command that includes a clear non-volatile memory command will clear the override flag (110) and the protected variable value (112). By comparison, a BIOS update command that does not include a clear non-volatile memory command will not clear these as the update will just clear the BIOS (104) and not the non-volatile memory device (108) where the override flag (11) and the protected variable value (112) are stored.

The present computing device (100), with the ability to override an SSID (106) for the computing device (100) with a protected variable value (112) associated with the printed circuit assembly (102), increases the efficiency of computing devices (100) as a single BIOS (104) with the SSID (106) replaced with any number of protected variable values (112) can be used. Accordingly, any computing device (100) with a particular circuit assembly (102) can use the same BIOS (104) notwithstanding different hardware functionalities. The difference in hardware functionalities to be enabled can be addressed via the drivers associated with the protected variable value (112).

Figure 2:
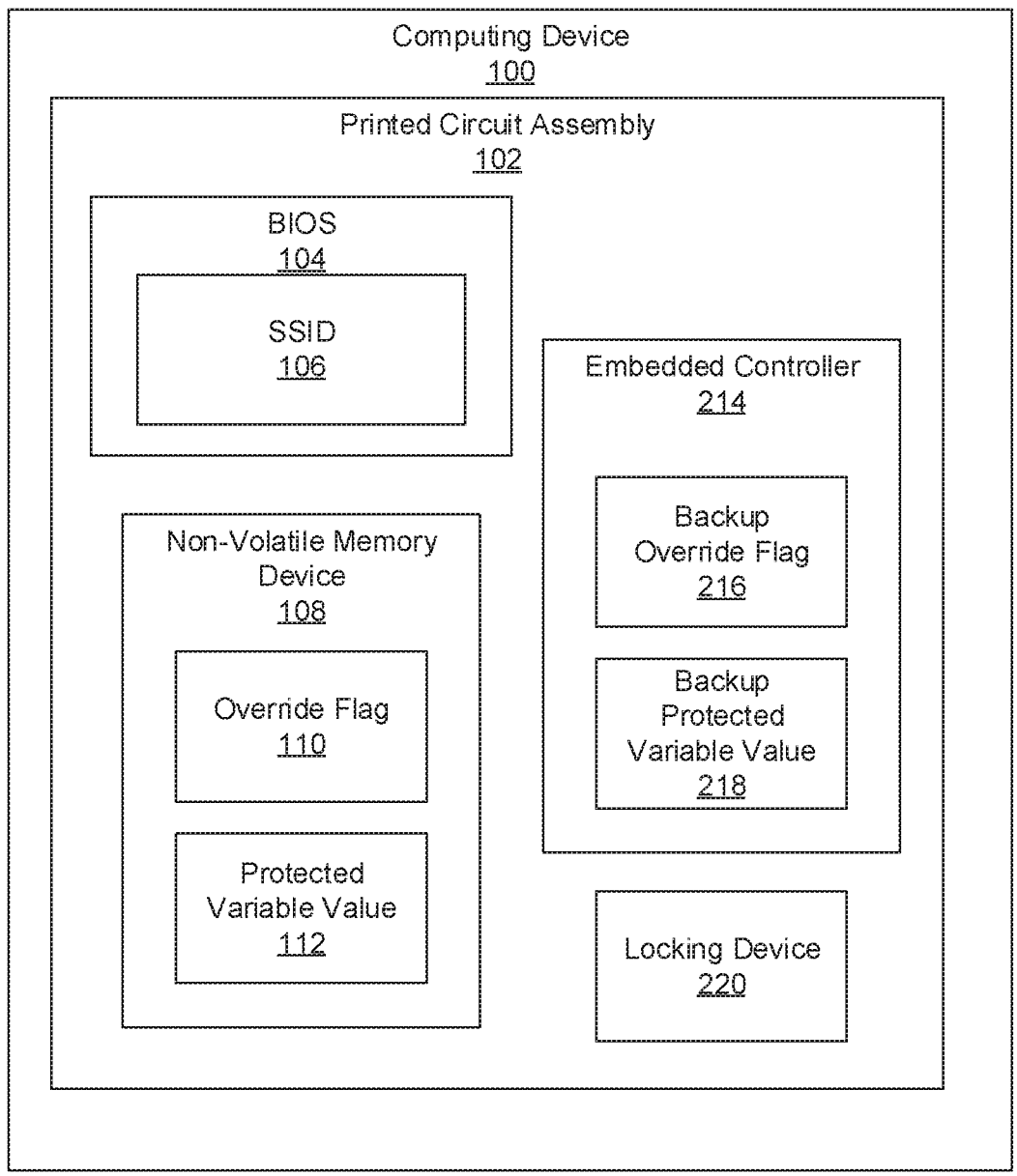
FIG. 2 is a block diagram of a computing device for overriding a SSID with a protected variable value, according to an example of the principles described herein.

FIG. 2 is a block diagram of a computing device (100) for overriding an SSID (106) with a protected variable value (112), according to an example of the principles described herein. In the example depicted in FIG. 2, the computing device includes the printed circuit assembly (102), BIOS (104), SSID (106), and non-volatile memory device (108) with its associated override flag (110) and protected variable value (112) as described above. In this example, the computing device (100) also includes an embedded controller (214) with a backup override flag (216) and a backup protected variable value (218).

Specifically, the embedded controller (214) refers to a controller where platform specific functions such as volume of built-in speakers and the brightness of the panel backlight. The embedded controller (214) provides a secure location where data can be stored because it cannot be hacked by a user. That is, the embedded controller (214) interface may be a platform-specific interface that is protected by a manufacturer such that a hacker cannot interpret data in the embedded controller (214). For example, a malicious user may destroy the BIOS (104), however, information stored in the embedded controller (214) can be used to restore the BIOS (104). The embedded controller (214) is accessible via an administrator authentication. Doing so ensures that malicious users can't get into adjust the backup override flag (216) and the backup protected variable value (218), but allows the values to be set by a programmer.

As their names imply, the backup override flag (216) and the backup protected variable value (218) are backups of the override flag (110) and the protected variable value (112). When the administrator authentication is received, the computing device (100) may be said to be in a factory mode wherein the backup override flag (216) and the backup protected variable value (218) are set. By comparison, when not in a factory mode, i.e., when in a user mode, and the embedded controller (214) is activated, the backup override flag (216) and the backup protected variable value (218) are copied to non-volatile memory device (108).

To further increase the security of the override flag (110) and the protected variable value (112), the computing device may include a locking device (220). The locking device (220) selectively allows programming of the override flag (110) and the protected variable value (112). That is, the locking device (220) enables either user mode or factory mode. When the locking device (220) is enabled, the computing device is in a user mode and the override flag (110) and protected variable value (112) are protected and cannot be altered. By comparison, when the locking device (220) is disabled, the computing device (110) is in a factory mode and the override flag (110) and the protected variable value (112) can be programmed.

Thus, the computing device (100) by implementing an embedded controller (214) with a backup override flag (216) and a backup protected variable value (218) ensure that the override flag (110) and the protected variable value (112) are not lost in any malicious, or inadvertent clearing of the non-volatile memory device (108). As the embedded controller (214) is not directly accessible by a user, there is also increased security against unwanted tampering of the backup copies of these values.

Figure 3:
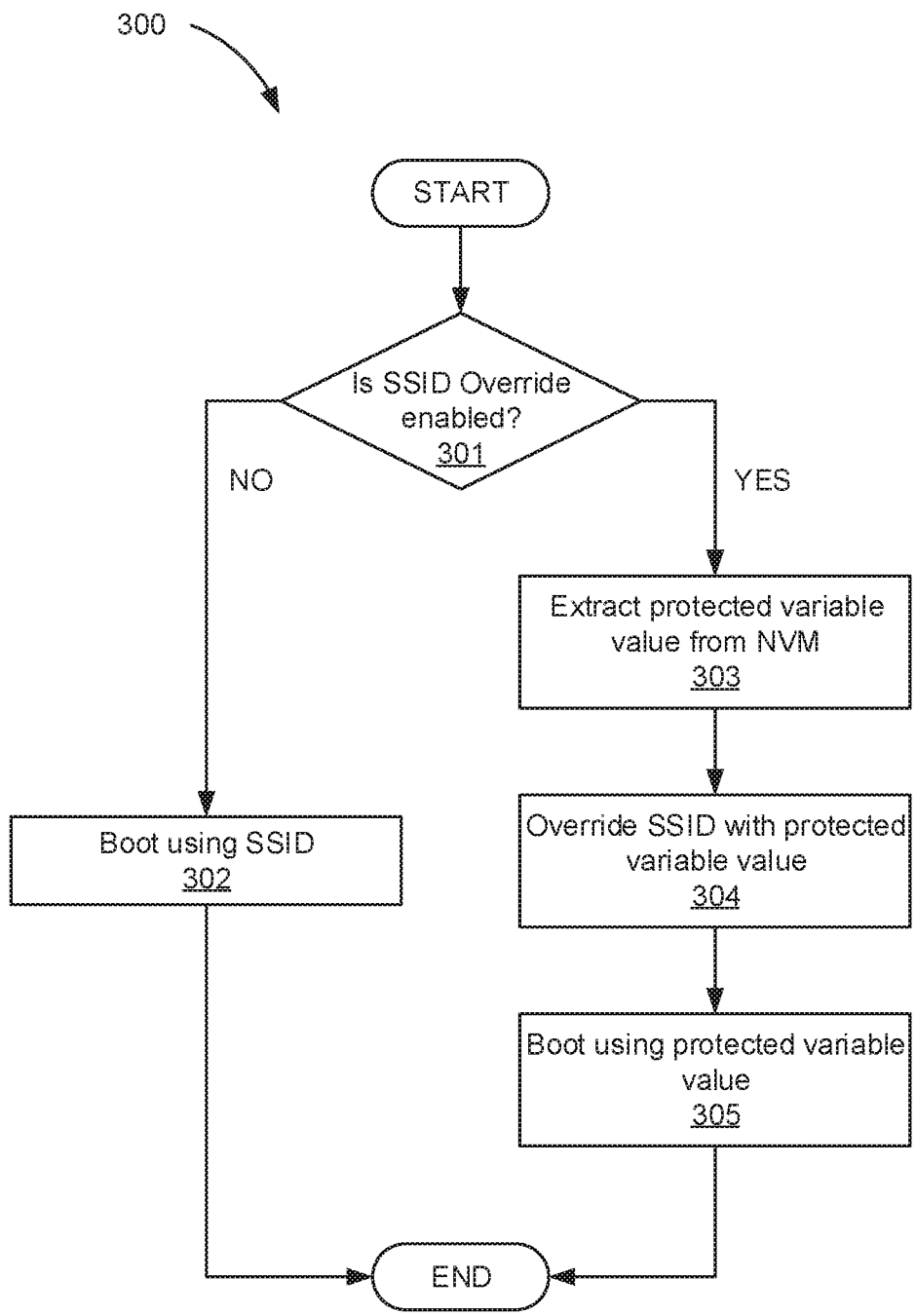
FIG. 3 is a flow chart of a method for overriding an SSID with a protected variable value, according to an example of the principles described herein.

FIG. 3 is a flow chart of a method (300) for overriding an SSID (FIG. 1, 106) with a protected variable value (FIG. 1, 112), according to an example of the principles described herein. First, it is determined (block 301) whether such an override is enabled. Specifically, an override flag (FIG. 1, 110) stored in non-volatile memory (FIG. 1, 108) of a computing device (FIG. 1, 100) is read to determine whether the override is enabled. Such a determination is made during startup of a computing device (FIG. 1, 100). That is, at initialization of a BIOS boot, the override flag (FIG. 1, 100) is read. If SSID (FIG. 1, 106) override is not enabled (block 301, determination NO), then the computing device (FIG. 1, 100) is booted (block 302) relying on the SSID (FIG. 1, 106) stored in the BIOS (FIG. 1, 104). Such a booting (block 302) operation configures the hardware components of the computing device (FIG. 1, 102) as mapped to the SSID (FIG. 1, 106).

By comparison, if SSID (FIG. 1, 106) override is enabled (block 302, determination YES), then the protected variable value (FIG. 1, 112) is extracted (block 303) from the non-volatile memory device (FIG. 1, 108) of the computing device (FIG. 1, 100). As noted above, the protected variable value (FIG. 1, 112) along with the override flag (FIG. 1, 110) are stored in non-volatile memory so that they are preserved if a computing device (FIG. 1, 100) is restarted or in the event of unintentional power loss.

The SSID (FIG. 1, 106) is then overridden (block 304) with the extracted protected variable value (FIG. 1, 112). Specifically, within the BIOS (FIG. 1, 104) an SSID field includes the SSID (FIG. 1, 106) by which the hardware is configured during SSID booting (block 302). Overriding (block 304) the SSID (FIG. 1, 106) may include re-writing the SSID field in the BIOS (FIG. 1, 104) with the protected variable value (FIG. 1, 112).

With the SSID (FIG. 1, 106) in the BIOS (FIG. 1, 104) overridden with the protected variable value (FIG. 1, 112), the computing device (FIG. 1, 100) is booted (block 305) relying on the protected variable value (FIG. 1, 112). Such a booting (block 305) operation configures the hardware components of the computing device (FIG. 1, 102) as mapped by the protected variable value (FIG. 1, 112).

Figure 4:
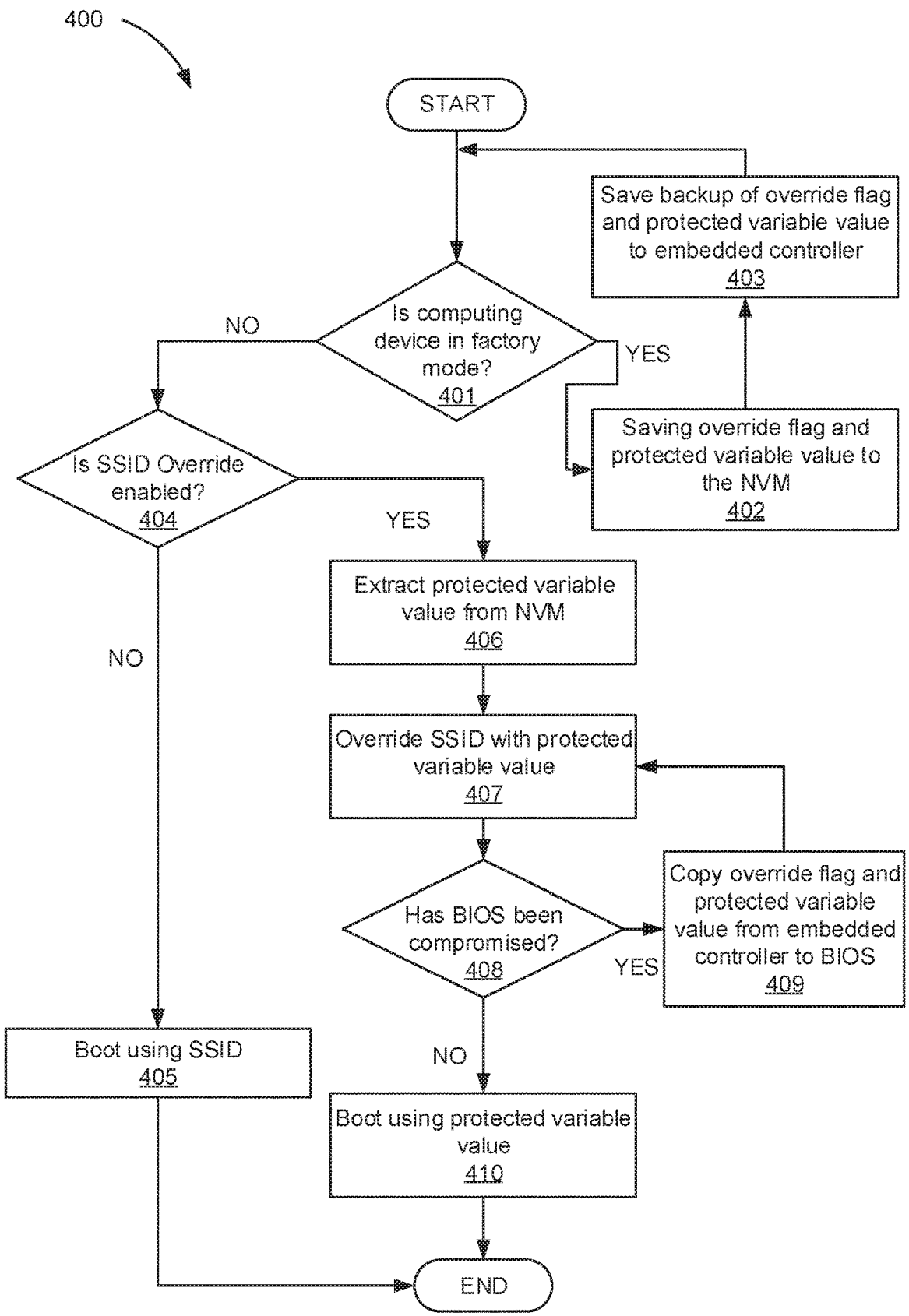
FIG. 4 is a flow chart of a method for overriding an SSID with a protected variable value, according to an example of the principles described herein.

FIG. 4 is a flow chart of a method (400) for overriding an SSID (FIG. 1, 106) with a protected variable value (FIG. 1, 112), according to an example of the principles described herein. According to the method (400), it is determined (block 401) whether the computing device (FIG. 1, 100) is in a factory mode. When in the factory mode, the computing device (FIG. 1, 100) can be set up to allow the override of an SSID (FIG. 1, 106) with a protected variable value (FIG. 1, 112). By comparison, when not in a factory mode, i.e., when in a user mode, such setting up is not permitted. Allowing for the setting up just in the factory mode increases security and disallows malfeasance by malicious or other users.

If the computing device is in a factory mode (block 401, determination YES), the override flag (FIG. 1, 110) and the protected variable value (FIG. 1, 112) are saved (block 402) to the non-volatile memory device (FIG. 1, 108) of the computing device (FIG. 1, 100). Storing the override flag (FIG. 1, 110) and the protected variable value (FIG. 1, 112) in the non-volatile memory device (FIG. 1, 108) allows them to be called during initialization of the computing device (FIG. 1, 100) and ensures they will remain there even in the face of computing device (FIG. 1, 100) power loss.

While in factory mode, a backup of the override flag (FIG. 2, 216) and the protected variable value (FIG. 2, 218) are saved (block 403) to the embedded controller (FIG. 2, 214) such that they may be accessed in the face of interruption of the BIOS (FIG. 1,104).

If the computing device (FIG. 1, 100) is not in a factory mode (block 401, determination NO), the computing device (FIG. 1, 100) is in a user mode. While in the user mode, adjustments are not made to the override flag (FIG. 1, 110) and the protected variable value (FIG. 1, 112). It is in this mode where a user operates the computing device (FIG. 1, 100). While in the user mode, during startup it is determined whether SSID (FIG. 1, 106) override is enabled (block 404). This may be performed as described in connection with FIG. 3.

If SSID (FIG. 1, 106) override is not enabled (block 404, determination NO), then the computing device (FIG. 1, 100) is booted (block 405) relying on the SSID (FIG. 1, 106) stored in the BIOS (FIG. 1, 104). This may be performed as described in connection with FIG. 3.

By comparison, if SSID (FIG. 1, 106) override is enabled (block 404, determination YES), then the protected variable value (FIG. 1, 112) is extracted (block 406) from the non-volatile memory device (FIG. 1, 108), the SSID (FIG. 1, 106) is then overridden (block 407) with the extracted protected variable value (FIG. 1, 112).

As described above, storing a backup override flag (FIG. 2, 216) and a protected variable value (FIG. 2, 218) in the embedded controller (FIG. 2, 214) allows for the use of a variable value despite the interruption of the BIOS (FIG. 1, 104). Accordingly, it is determined (block 408) whether the BIOS (FIG. 1, 104) has been compromised, for example via a crash or the acts of a malicious user. If, the BIOS (FIG. 1, 104) has not been compromised (block 408, determination NO), the computing device (FIG. 1, 100) is booted (block 410) relying on the protected variable value (FIG. 1, 112) as described in connection with FIG. 3.

By comparison, if it is determined that the BIOS (FIG. 1, 104) has been compromised (block 408, determination YES), the backup override flag (FIG. 2, 216) and the backup variable value (FIG. 2, 218) are copied (block 410) from the embedded controller (FIG. 2, 214) to the non-volatile memory device (FIG. 1, 108) such that they may override (block 407) the SSID (FIG. 1, 106) value and be used to boot (block 408) the computing device (FIG. 1, 100).

Figure 5:
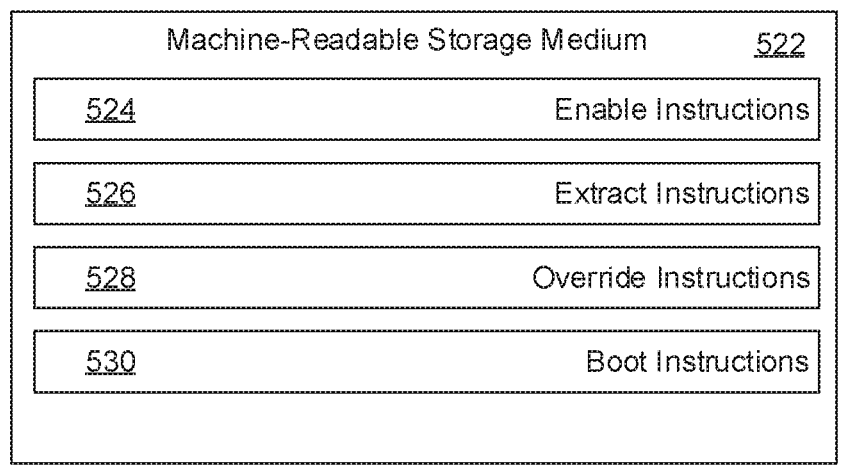
FIG. 5 is a diagram of a computer program product for overriding an SSID with a protected variable value, according to an example of the principles described herein.

FIG. 5 is a diagram of a tangible machine-readable storage medium (522) for overriding an SSID (FIG. 1, 106) with a protected variable value (FIG. 1, 112), according to an example of the principles described herein. To achieve its desired functionality, a computing system includes various hardware components. Specifically, the computing system includes a processor. Machine-readable storage medium (522) is communicatively coupled to the processor. The machine-readable storage medium (522) includes a number of instruction sets (524, 526, 528, 530) for performing a designated function. The machine-readable storage medium (522) causes the processor to execute the designated function of the instruction sets (524, 526, 528, 530).

Although the following descriptions refer to a single machine-readable storage medium (522), the descriptions may also apply to multiple machine-readable storage mediums. In such examples, the instruction sets (524, 526, 528, 530) may be distributed (e.g., stored) across multiple machine-readable storage mediums.

The machine-readable storage medium (522) represents any tangible and non-transitory memory capable of storing data such as programmed instructions or data structures used by the computing system.

Referring to FIG. 5, enable instructions (524), when executed by a processor, may cause the computing system to, during startup of a computing device (FIG. 1, 100), determine whether an override of an SSID (FIG. 1, 106) of a BIOS (FIG. 1, 104) with a protected variable value (FIG. 1, 112) is enabled. Extract instructions (526), when executed by a processor, may cause the computing system to, when enabled, extract the protected variable value (FIG. 1, 112) from a non-volatile memory device (FIG. 1, 108) of the computing device (FIG. 1, 100). Override instructions (528), when executed by a processor, may cause the computing system to override the SSID (FIG. 1, 106) in the BIOS (FIG. 1, 104) with the protected variable value (FIG. 1, 112). Boot instructions (530), when executed by a processor, may cause the computing system to boot the computing device (FIG. 1, 100) based on the protected variable value (FIG. 1, 112).

In summary, using such a computing device 1) allows for one BIOS to be used per printed circuit assembly; 2) increases organizational efficiency as redundancy in BIOS is reduced; 3) saves the cost of regulatory fees of maintaining similar printed circuit assemblies associated with different SSIDs, and 4) reduces maintenance of multiple BIOS codes with different SSIDS for shared printed circuit assemblies. However, the devices disclosed herein may address other matters and deficiencies in a number of technical areas.

What is claimed is:

1. A computing device comprising:
    a printed circuit assembly;
    a basic input/output system (BIOS) coupled to the printed circuit assembly, the BIOS comprising a subsystem identifier (SSID); and
    a non-volatile memory device comprising:
        an override flag to indicate whether an override of the SSID is enabled; and
        a protected override variable value to, when enabled, override the SSID in the BIOS.

2. The device of claim 1, further comprising an embedded controller coupled to the printed circuit assembly to store a backup override flag and a backup protected variable value.

3. The device of claim 2, wherein the embedded controller is accessible via an administrator authentication.

4. The device of claim 1, wherein;
    the SSID is associated with the computing device; and
    the protected variable value is associated with the printed circuit assembly and associated functionalities associated with the printed circuit assembly.

5. The device of claim 1, wherein the override flag and protected variable value are preserved following a load-default command.

6. The device of claim 1, wherein the override flag and the protected variable value are cleared after a BIOS update with a clear non-volatile memory command.

7. The device of claim 1, wherein the override flag and the protected variable value are preserved following a BIOS update without a clear non-volatile memory command.

8. The device of claim 1, further comprising a locking device to allow selective programming of the protected variable value.

9. The device of claim 1, wherein:
    the override flag is a Boolean value; and
    the protected variable value is a 2-byte value.

10. A method comprising:
    during startup of a computing device, determining whether an override of a subsystem identifier (SSID) of a basic input/output system (BIOS) with a protected variable value is enabled;
    when enabled, extracting the protected variable value from a non-volatile memory device of the computing device; and
    overriding the SSID in the BIOS with the protected variable value; and
    booting the computing device based on the protected variable value.

11. The method of claim 10, further comprising:
    activating an embedded controller of the computing device;
    determining when the computing device is in a factory mode;

when in the factory mode, saving a copy of the override flag and the protected variable value to the embedded controller.

12. The method of claim 11, further comprising:
when the computing device is in a user mode, determining when the BIOS has been compromised;
when the BIOS has been compromised, copying the backup override flag and the backup protected variable value from the embedded controller to the BIOS.

13. The method of claim 10, further comprising saving the protected variable value to the non-volatile memory device during a factory mode.

14. A non-transitory machine-readable storage medium encoded with instructions executable by a processor, the machine-readable storage medium comprising:
instructions to, during startup of a computing device, determine whether an override of a subsystem identifier (SSID) of a basic input/output system (BIOS) with a protected variable value is enabled;
instructions to, when enabled, extract the protected variable value from a non-volatile memory device of the computing device; and
instructions to override the SSID in the BIOS with the protected variable value; and
instructions to boot the computing device based on the protected variable value.

15. The machine-readable storage medium of claim 14, wherein:
the SSID is associated with the computing device; and
the protected variable value is associated with the printed circuit assembly and associated functionalities associated with the printed circuit assembly.

* * * * *